United States Patent [19]

Kihira et al.

[11] Patent Number: 5,403,887
[45] Date of Patent: Apr. 4, 1995

[54] RESIN COMPOSITION OF A MODIFIED POLYOLEFIN AND A POLYAMIDE OR POLYESTER

[75] Inventors: Michiharu Kihira; Hiroshi Nakano, both of Yokkaichi, Japan

[73] Assignee: Mitsubishi Petrochemical Company, Ltd., Tokyo, Japan

[21] Appl. No.: 848,020

[22] Filed: Mar. 9, 1992

[30] Foreign Application Priority Data

Mar. 15, 1991 [JP] Japan .................................. 3-051383
Mar. 15, 1991 [JP] Japan .................................. 3-051384
Mar. 15, 1991 [JP] Japan .................................. 3-051385

[51] Int. Cl.⁶ ...................... C08L 77/00; C08L 67/00
[52] U.S. Cl. ........................................ 525/64; 525/66
[58] Field of Search ..................... 525/66, 64

[56] References Cited

U.S. PATENT DOCUMENTS

| | | | |
|---|---|---|---|
| 4,174,358 | 11/1979 | Epstein | 525/183 |
| 4,404,312 | 9/1983 | Kokubu et al. | 524/504 |
| 4,997,875 | 3/1991 | Geddes et al. | 524/504 |
| 5,095,063 | 3/1992 | Okada et al. | 524/413 |
| 5,106,909 | 4/1992 | Sezume et al. | 525/176 |
| 5,244,970 | 9/1993 | Kobayashi et al. | 525/63 |
| 5,252,661 | 10/1993 | Reimann et al. | 524/514 |

FOREIGN PATENT DOCUMENTS

| | | |
|---|---|---|
| 0265527 | 5/1988 | European Pat. Off. . |
| 0391744 | 10/1990 | European Pat. Off. . |
| 86/04076 | 7/1986 | WIPO . |
| 88/05452 | 7/1988 | WIPO . |

*Primary Examiner*—Ana L. Carrillo
*Attorney, Agent, or Firm*—Oblon, Spivak, McClelland, Maier & Neustadt

[57] ABSTRACT

A resin composition comprises the following components (A) and (B):

Component (A): 90 to 10% by weight of modified polyolefin resin obtained by introducing a group selected from a) hydroxyl group, b) epoxy group and c) carboxyl group into a crystalline olefin copolymer consisting of at least one of ethylene and α-olefins each having 3 to 8 carbon atoms and at least one chain non-conjugated diene;

Component (B): 10 to 90% by weight of polyamide resin or saturated polyester resin.

This resin composition is suitable for use as a molding material for automotive, electrical parts and the like.

8 Claims, No Drawings

RESIN COMPOSITION OF A MODIFIED POLYOLEFIN AND A POLYAMIDE OR POLYESTER

BACKGROUND OF THE INVENTION

1. Field of the Invention

The present invention relates to a composition comprising a polyolefin resin and an engineering resin. Particularly, the present invention relates to a resin composition comprising (A) a modified polyolefin resin obtained by introducing a group selected from a) hydroxyl group, b) epoxy group and c) carboxyl group into a crystalline olefin copolymer consisting of at least one of ethylene and α-olefins each having 3 to 8 carbon atoms and at least one chain non-conjugated diene, and (B) a polyamide resin or saturated polyester resin. The resin composition has good basic characteristics such as impact resistance, rigidity, heat resistance, moldability, moisture resistance and chemical resistance, all of which are required for molding materials for automobile parts, electric product parts and the like.

2. Description of the Related Art

Polyolefin resins are widely used as molding materials because they are inexpensive and have excellent mechanical strength, moldability, moisture resistance and the like. In order to widen the application field of polyolefin resins, an attempt is made to mix the polyolefin resins with engineering plastics such as polyamide resins or the like so as to improve heat resistance and rigidity.

Since polyamide or saturated polyesters generally have poor compatibility with polyolefins, a finely uniform mixing state cannot be obtained by simply mixing using an extruder or a molding machine, so obtained article has a poor impact strength. In order to improve the compatibility, a method has been proposed in which a functional group such as a carboxyl group, an epoxy group or the like, which is expected to produce bonding reaction with a polyamide or saturated polyester, is introduced into a polyolefin having poor reactivity to form a modified polyolefin which is then mixed with a polyamide or saturated polyester (for example, Japanese Patent Publication No. 45-30945). Another method is described in "Polymer Chemistry" Vol. 29, 265 pp (1972) in which crystalline polypropylene and polyamide are mixed in the presence of maleic anhydride-modified polypropylene. Japanese Patent Publication No. 57-59216 and Japanese Patent Laid-Open No. 58-105448 disclose compositions each comprising a saturated polyester resin and a maleic acid-modified polyolefin.

Although the technique of improving impact resistance strength by mixing a polyamide resin with an ethylene-glycidyl methacrylate copolymer is generally known, copolymerizable olefin species are limited, and sufficient properties with respect to rigidity and heat resistance are not obtained in the present situation. Japanese Patent Laid-Open No. 51-144452 discloses that polyalkylene terephthalate is mixed with a polyolefin modified with a glycidyl ester of an α,β-unsaturated carboxylic acid for the purpose of improving impact resistance strength.

The method of producing modified polypropylene by grafting polypropylene with maleic anhydride or glycidyl acrylate under conditions of radical reaction is widely known (Japanese Patent Laid-Open Nos. 59-62613 and 61-266411). However, the radical grafting method generally has a low grafting rate and grafting efficiency. If an attempt is made to increase the modification degree, the method causes the problem that undesirable reaction such as molecular breakage, crosslinking or the like of the main polymer to be grafted easily takes place, and thus a highly modified product cannot be obtained. These methods realize the production of compositions each comprising a modified polyolefin and a polyamide or polyester in a finely dispersed state and achieve the purpose of improving the balance of properties such as impact resistance strength, heat rigidity and the like. However, nowadays, there is a demand for further improving the properties.

It is an object of the present invention to provide a composition comprising a polyolefin resin and a polyamide resin or a saturated polyester resin and having improved impact resistance strength. Particularly, it is an object of the present invention to find a novel modified polyolefin having further improved compatibility with polyamides or saturated polyesters and obtain a composition having good compatibility which cannot be attained by the prior art.

SUMMARY OF THE INVENTION

The present invention provides a resin composition comprising the following components (A) and (B):

Component (A): 90 to 10% by weight of modified polyolefin resin obtained by introducing a group selected from a) hydroxyl group, b) epoxy group and c) carboxyl group into a crystalline olefin copolymer consisting of at least one of ethylene and α-olefins each having 3 to 8 carbon atoms and at least one chain non-conjugated diene;

Component (B): 10 to 90% by weight of polyamide resin or saturated polyester resin.

DETAILED DESCRIPTION OF THE INVENTION

The present invention is described in detail below.

Crystalline Olefin Copolymer

The crystalline olefin copolymer used in the present invention consists of at least one of ethylene and α-olefins each having 3 to 8 carbon atoms and at least one chain non-conjugated diene expressed by the following formula:

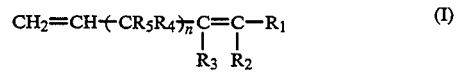

(wherein $R_1$ is an alkyl group having 1 to 8 carbon atoms, $R_2$, $R_3$, $R_4$ and $R_5$ is each a hydrogen atom or an alkyl group having 1 to 8 carbon atoms, n is a number of 1 to 10). The copolymer contains 0.1 to 30 mol % of diene, preferably 0.5 to 15 mol %.

The copolymer has crystallinity. The crystallinity measured by X-ray diffraction at room temperature is preferably at least 10%, more preferably at least 20%. The copolymer has a melting point of at least 40° C. A decrease in crystallinity causes a decrease in elastic modulus of the final composition. The copolymer must also have a molecular weight sufficient to assume a resin state at room temperature.

For example, when propylene is used as a main component, the copolymer preferably has a molecular weight corresponding to a melt flow rate of 0.01 to 500 g/10 minutes, preferably 0.05 to 100 g/10 minutes, which is measured according to JIS-K-6758 (measured at 230° C. with a load of 2.16 Kgf), and an elastic modulus of 500 to 80,000 Kg/cm², which is measured according to JIS-K7203 corresponding to ASTM D1238-86 and ASTM D790-86 respectively.

Examples of ethylene and α-olefins which can be used as a component of the copolymer include ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane, 2-vinylcyclo[2,2,1]-heptane and the like. Preferable examples of these substances include ethylene, propylene, 1-butene, 1-hexene, 3-methyl-1-butene, 3-methyl-1-pentene, 4-methyl-1-pentene, 3-methyl-1-hexene and the like. Ethylene, propylene, 1-butene, 3-methyl-1-butene and 4-methyl-1-pentene are particularly preferable. These α-olefins may be used singly or in combination of two or more compounds. Particularly, when 1-hexene is used as an α-olefin, it is preferable to use at least one of ethylene, propylene, 1-butene, 4-methyl-1-pentene and 3-methyl-1-butene in combination with 1-hexene. When two or more α-olefins are used, the α-olefins may be distributed either randomly or in a block in an unsaturated copolymer resin.

In the chain non-conjugated diene expressed by the formula (1), it is preferable that n is 5 or less, $R_4$ and $R_5$ are each a hydrogen atom, and $R_1$, $R_2$ and $R_3$ are each a hydrogen atom or an alkyl group having 1 to 4 carbon atoms, and that the groups are not all hydrogen atoms. Preferable examples of diene compounds include 1,4-dienes such as 4-methyl-1,4-hexadiene, 5-methyl-1,4-hexadiene and the like; 1,5-dienes such as 1,5-heptadiene, 1,5-octadiene, 5-methyl-1,5-heptadiene, 6-methyl-1,5-heptadiene and the like; 1,6-dienes such as 1,6-octadiene, 6-methyl-1,6-octadiene, 7-methyl-1,6-octadiene, 2-methyl-1,6-octadiene, 6-methylidene-1-octene, 6-ethyl-1,6-octadiene, 6,7-dimethyl-1,6-octadiene, 1,6-nonadiene and the like; 1,7-dienes such as 1,7-nonadiene, 7-methyl-1,7-nonadiene, 8-methyl-1,7-nonadiene and the like; 1,8-dienes such as 8-methyl-1,8-decadiene, 9-methyl-1,8-decadiene and the like. Of these dienes, 4-methyl-1,4-hexadiene, 5-methyl-1,4-hexadiene, 5-methyl-1,5-heptadiene, 6-methyl-1,5-heptadiene, 6-methyl-1,6-octadiene and 7-methyl-1,6-octadiene are particularly preferable. The dienes may be used singly or in combination of two or more dienes.

The crystalline olefin copolymer to be modified according to the present invention can be produced by copolymerization using the same apparatus and method as those used for producing an α-olefin copolymer by copolymerizing ethylene or an α-olefin and a chain non-conjugated diene using the Ziegler-Natta catalyst for α-olefin polymerization. The chain non-conjugated diene may be distributed randomly or in a block manner in the copolymer produced. The content of the non-conjugated diene is preferably 0.1 to 30 mol %, more preferably 0.5 to 15 mol %. If the diene content is less than 0.1 mol %, a high modification degree cannot be obtained by modification reaction. If the diene content exceeds 30 mol %, since the rate of reaction for producing the copolymer is decreased, there is the problem that the productivity is decreased due to an increase in production of low-crystalline by-product polymer. The final product also has poor quality. It is thought that this is because secondary reaction such as crosslinking or molecular breakage of the copolymer itself is easily produced during modification reaction.

Modified Polyolefin Resin

The modified polyolefin can be obtained by introducing hydroxyl groups (—OH), epoxy groups

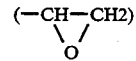

or carboxyl groups (—COOH) into the crystalline olefin copolymer by the method below.

Hydroxyl-Modified Polyolefin Resin

The hydroxyl-modified polyolefin resin used in the present invention is obtained by introducing hydroxyl groups into the crystalline olefin copolymer. The introducing method is not particularly limited. Examples of introducing methods include (1) the method of reacting the olefin copolymer with a compound having an ethylenic double bond and a hydroxyl group in the same molecule, for example, 2-hydroxyethyl methacrylate, 2-hydroxyethyl acrylate, 2-hydroxypropyl acrylate or the like, both of which coexist in the presence of a radical initiator such as an organic peroxide or the like; (2) a method of converting the unsaturated bonds contained in the olefin copolymer into hydroxyl groups by oxidation; and (3) a method of hydrolyzing the epoxy groups introduced by various reactions. Typical examples of the method (2) include oxidation through peroxidation with an organic acid such as hydrogen peroxide, formic acid or the like; oxidation with permanganate or the like in the presence or absence of an interphase moving catalyst; oxidation with hydrogen peroxide, permanganate or the like using as a catalyst an oxide of osmium, ruthenium, tungsten or the like; and hydrolysis of a product of addition of a hydrogen halide such as hydrogen bromide or the like. Although each of the reactions is generally performed in a solution state or melt state, reaction can be performed in a swelling state or a suspension state. The content of hydroxyl groups is at least 0.1% by weight, preferably 0.5 to 10% by weight, in terms of the content of 2-hydroxyethyl methacrylate.

Epoxy-Modified Polyolefin Resin

The epoxy-modified polyolefin resin used in the present invention is obtained by introducing epoxy groups into the crystalline olefin copolymer. The introducing method is not particularly limited. Examples of introducing methods include (1) the method of reacting the olefin copolymer with a compound having an ethylenic double bond and an epoxy group in the same molecule, for example, glycidyl ester of an α,β-unsaturated acid such as glycidyl acrylate, glycidyl methacrylate, glycidyl ethacrylate or the like, both of which coexist in the presence of a radical initiator such as an organic peroxide or the like; and (2) the method of converting the unsaturated bonds contained in the olefin copolymer into epoxy groups by oxidation. Typical examples of the method (2) include oxidation with a peracid such as performic acid, perbenzoic acid or the like; oxidation with hydrogen peroxide or hydroperoxide in the presence or absence of a catalyst such as a vanadium compound, a tungsten compound or the like; oxidation with alkali hydrogen peroxide; and oxidation with sodium hypochloride or the like in the presence or absence of a porphyrin complex or an interphase moving catalyst. Although each of the reactions is generally performed in a solution state or melt state, reaction can be performed in a swelling state or a suspension state. The content of epoxy groups is at least 0.1% by weight, preferably 0.5 to 10% by weight, in terms of the content of glycidyl methacrylate.

Carboxyl-Modified Polyolefin Resin

The carboxyl-modified polyolefin resin used in the present invention is obtained by reacting the crystalline olefin copolymer with an unsaturated carboxylic acid or a derivative thereof under conditions of radical polymerization.

Examples of $\alpha,\beta$-unsaturated carboxylic acids or derivative thereof which can be used as a modifier include unsaturated carboxylic acids such as acrylic acid, maleic acid, fumaric acid, tetrahydrophthalic acid, itaconic acid, citraconic acid, crotonic acid, isocrotonic acid and the like; and derivatives thereof such as acid halides, amides, imides, anhydrides, esters and the like. Examples of such derivatives include malenyl chloride, maleimide, maleic anhydride, citraconic anhydride, monomethyl maleate, dimethyl maleate, glycidyl maleate and the like. Of these compounds, anhydrides are preferable, and maleic anhydride is particularly preferable. These carboxylic acids and derivatives thereof can be used in combination of two or more compounds. The content of the modifier is preferably at least 0.1% by weight, more preferably 1 to 10% by weight.

Examples of methods of generating radicals for producing the modified polyolefin resin in the present invention include a method of applying radiation such as $\gamma$-rays, electron beams or the like in the coexistence of the crystalline olefin copolymer and the modifier; a method of applying radiation to the crystalline olefin copolymer and then causing the modifier to coexist with the copolymer; the method of heating the crystalline olefin copolymer and the modifier, both of which coexist, in the presence or absence of a radical polymerization catalyst and the like. Any one of a solution state, a melt state and a suspension state can be employed.

Examples of radical polymerization catalysts include organic and inorganic peroxides such as benzoyl peroxide, t-butyl peroxybenzoate, dicumyl peroxide, t-butyl hydroperoxide, t-butyl peroxyacetate, diisopropyl peroxydicarbonate, 2,2-bis(t-butylperoxy)octane, methyl ethyl ketone peroxide, potassium peroxide, hydrogen peroxide and the like; azo compounds such as $\alpha,\alpha'$-azobisisobutryonitrile and the like. A peroxide can be combined with a reducing agent so as to be used as a redox system. For example, hydrogen peroxide can be combined with a ferrous halt.

The catalyst is selected from the above radical polymerization catalysts in relation to the type of the monomer used and the polymerization method used. The radical polymerization catalysts can be used singly or in combination of two or more catalysts.

The temperature of radical polymerization reaction is generally within the range of 30° to 350° C., preferably within the range of 50° to 300° C. The polymerization time is within the range of 30 seconds to 50 hours, preferably within the range of 1 minute to 24 hours.

The amount of the radical polymerization catalyst used is appropriately selected from the range of 0 to 100 parts by weight, preferably the range of 0 to 30 parts by weight, relative to 100 parts by weight of crystalline olefin copolymer.

In the present invention, the modified polyolefin resin component (A) may be taken place by polyolefin, component (C), which is not identical to the component (A) in an amount of 2 to 72% by weight based on the total composition. Examples of such polyolefins that are preferable from the viewpoints of moldability, rigidity and economy include polypropylene polymers such as propylene homopolymers, propylene/ethylene copolymers, propylene/butene-1 copolymers, propylene/ethylene/butene-1 copolymers, propylene/4-methylpentene-1 copolymers and the like.

Polyamide Resin or Saturated Polyester Resin

Examples of polyamide resins that can be used in the present invention include polyamides obtained by condensation polymerization of an aliphatic, alicyclic or aromatic diamine such as hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane), m- or p-xylenediamine or the like and a dicarboxylic acid such as adipic acid, suberic acid, sebacic acid, cyclohexadicarboxylic acid, terephthalic acid or the like or a derivative thereof; polyamides obtained from lactams such as $\epsilon$-caprolactam, $\omega$-laurolactam or the like; polyamides obtained by condensation of $\epsilon$-aminocaproic acid or 11-aminoundecanoic acid; and mixtures thereof. Typical example of such polyamides include polycaproamide, polyhexamethyleneadipamide, polyhexamethylenesebacamide, polydodecaneamide and copolymer amides consisting of the above amides. Polycaproamide (nylon 6) and polyhexamethyleneadipamide (nylon 66) are preferable because of their high melting points, rigidity and moldability and remarkable effect of improving the quality of polyolefins. Although the molecular weight of the polyamide used is not particularly limited, a polyamide having relative viscosity (JIS-K-6810) within the range of 2 to 5 is generally used. If required, an elastomer-reinforced polyamide which is known as tough nylon can be used. A polyamide containing fibers such as glass fibers or the like and an inorganic filler such as talc or the like can also be used.

The saturated polyester resin used in the present invention is a thermoplastic saturated polyester obtained by condensation copolymerization of a dicarboxylic acid, a lower alkyl ester thereof, an acid halide or an acid anhydride derivative and glycol.

Examples of dicarboxylic acids include oxalic acid, malonic acid, succinic acid, glutaric acid, sebacic acid, terephthalic acid, isophthalic acid, p-carboxyphenoxyacetic acid, 2,6-naphthalenedicarboxylic acid, 2,7-naphthalenedicarboxylic acid and the like.

Examples of glycols include straight chain alkylene glycols each having 2 to 12 carbon atoms, such as ethylene glycol, 1,3-propylene glycol, 1,4-butene glycol, 1,6-hexene glycol, pyrocatechol, resorcinol, hydroquinone, cyclohexanedimethanol, and alkyl-substituted derivatives of these compounds.

Preferable examples of polyesters include polyethylene terephthalate, polybutylene terephthalate, polynaphthalene terephthalate, poly(1,4-cyclohexanedimethylene terephthalate) and the like. Commercially available liquid crystal polyesters such as X7G produced by Eastman Kodak Co., Vectra produced by Hoechst Celanese Co., Econol produced by Sumitomo Chemical Co, Ltd. and the like are also preferable.

As occasion demands, elastomer-reinforced polyester resins can also be used. Polyesters containing fibers such as glass fibers or the like or a filler such as talc or the like can be used.

The polyamide resin or polyester resin can be selected from the viewpoints of heat resistance, rigidity, moldability, moisture resistance and economy. They can be used in combination of two or more resins.

Additional Components

The resin composition according to the present invention can contain other additional components. For example, antioxidants, weather resistance improvers and crystallization accelerators can be added in amounts of 0.1 to 5% by weight each, and flame retardants, plasticizers and fluidity improvers can be added in amounts of 5 to 30% by weight each. An organic or inorganic filler such as glass fibers, mica, talc, wollastonite, potassium titanate, calcium carbonate, silica or the like can also be added in amounts of 5 to 60% by weight for improving rigidity, heat resistance and dimensional accuracy.

Various elastomers can also be added for improving impact resistance strength. Examples of elastomers include styrene-butadiene block or random copolymers, hydrides thereof, ethylene-propylene (diene) copolymers, polyester elastomers, polyamide elastomers, nitrile rubber and the like. An elastomer which is modified by a known method such as acid modification, hydroxyl modification or epoxy modification for improving the insufficient compatibility with the components of the resin composition can be used. Although the elastomer content depends upon the desired properties, when it is desired to balance the rigidity and the impact resistance strength, as in the present invention, the elastomer content in the composition is preferably 20% by weight or less.

Component Ratio

In the present invention, the component (A) consisting of the modified polyolefin resin and the component (B) consisting of the polyamide resin or saturated polyester resin are well mixed in any component ratio. However, when the resin composition contains the modified polyolefin resin as a main component, the heat resistance of the polyolefin is improved. When the resin composition contains the polyamide or polyester as a main component, the moisture resistance and moldability are improved. When the weight ratio between the component (A) consisting of the modified polyolefin resin and the component (B) consisting of the polyamide resin or saturated polyester resin is within the range of 90:10 to 10:90, preferably 70:30 to 30:70, the properties of both components are balanced.

Method of Producing Resin Composition

The mixing method for obtaining the resin composition of the present invention is not particularly limited, and any known methods which are generally put into practical use can be employed. A typical example of such methods is the method in which a powdery, granular or fibrous component and, if required, the above-described additional components, are uniformly mixed by an agitator such as a Henschel mixer or the like and then melted and kneaded by a monoaxial or multi-axial extruder. The final resin composition can also be obtained by mixing each component in turn according to the designer mixing ratios of the components. This method is effective when it is necessary to control the compatibility of the components and the kneading history of particular components so as to control the deterioration or change of properties of resins. The method of mixing all or part of the components in a solution state is also effective for the same purpose.

EXAMPLES

Methods of the present invention are illustrated with reference to the following examples, but the invention is not intended to be limited only to these following examples.

The properties of the components of examples and comparative examples were measured and evaluated by the following methods:

(1) Production of composition: Predetermined amounts of dry components were melted and kneaded by Labo Plastomill kneader manufactured by Toyo-seiki Seishakusho at 28° C. and then ground to obtain a powdery sample.

(2) Formation of test piece: A sheet was obtained by pressure molding at 280° C. using a hydraulic press molding machine manufactured by Toyo-seiki Seisakusho and then cut into a predetermined test piece.

(3) MFR (melt flow rate): MFR was measured according to JIS K-6758.

(4) Impact resistance strength: Three test pieces each having a thickness of 2 mm were put in layers, fixed by adhesive tape and then measured with respect to impact resistance using an Izod impact tester manufactured by Toyo-seiki Seisakusho according to ISO R180-1969 (JIS K7110) Izod impact resistance without notch.

(5) Evaluation of mixing state: A test sample was cut from the test piece formed by method (2), subjected to ion etching and then observed with respect to the diameters of dispersed particles on a scanning electron microscope (S-2400, manufactured by Hitachi, Ltd.)

Reference Example 1 (Production of Crystalline Olefin Copolymer)

Reference Example 1-1

After nitrogen gas in a 1-l autoclave was replaced by propylene, 330 ml of n-heptane was introduced into the autoclave, and 0.1 g of triethylaluminum and 0.07 g of magnesium-containing solid titanium were then added in this order. After 125 Nml of hydrogen was then added to the autoclave, propylene was supplied under pressure, and the resultant mixture was then agitated at 50° C. and 0.5 kg/cm$^2$G. 70 ml of 7-methyl-1,6-octadiene was then added to the mixture, and polymerization was effected for 5 hours at 65° C. and 5.5 kg/cm$^2$G, while propylene was supplied under pressure. After the catalyst was then inactivated by n-butanol, the catalyst residue was extracted with water, and the copolymer obtained was centrifugally recovered and then dried. The crystalline propylene copolymer obtained had MFR at 230° C. of 1.7 g/10 minutes, contained 2.7 mol % of 7-methyl-1,6-octadiene which mainly formed 1,2-addition bonds (H-NMR analysis) and a crystallinity of 45% (X-ray diffractometry).

Reference Example 1-2

After nitrogen gas in a 10-l autoclave was replaced by propylene, 4.0 l of mixture containing 4-methyl-1,4-hexadiene and 5-methyl-1,4-hexadiene with a molar ratio of 8:2 was charged in the autoclave. 9 g of triethylaluminum and 4 g of carrier-supported catalyst, which was prepared by the above-described method, were added in this order. After 5 Nl of hydrogen was then added to the autoclave, propylene was supplied under pressure, followed by agitation at 25° C. and 2.5 kg/cm²G. The temperature was then increased, while propylene was supplied under pressure, and the resultant mixture was kept at 65° C. and 8 kg/cm²G and subjected to polymerization for 2 hours. 1140 g of dry powder was then obtained by the same method as that employed in Reference Example 1-1. The powder had a bulk density of 0.41 g/cc.

The copolymer obtained had MFR (230° C.) of 2,2 g/10 minutes and showed a melting peak at 152.0° C. in DSC. The H$^1$-NMR analysis of the copolymer showed that the copolymer contained 3.8 mol % of methyl-1,4-hexadiene and had the structure of 1,2-addition of the diene monomer without chains (crystallinity 46%).

Reference Example 2 (Synthesis of hydroxyl-modified polyolefin resin)

Reference Example 2-1

250 g of crystalline olefin copolymer which was obtained in Reference Example 1-1 and 75 g of 2-hydroxyethyl methacrylate were added to 5000 ml of xylene contained in a 10-1 flask with an agitator the air in which was previously replaced by nitrogen. The resultant mixture was then agitated at 110° C. to form a solution. 500 ml of xylene solution containing 25 g benzoyl peroxide was then added dropwise over a period of 2 hours, followed by reaction at 110° C. for 3 hours. The product obtained was separated by pouring the reaction product into cold acetone, filtered off, washed and then dried to obtain 2-hydroxyethyl methacrylate graft modified propylene copolymer (A-1). The resin obtained contained 2.0 % by weight of 2-hydroxyethyl methacrylate (infrared absorption method) and had MFR at 230° C. of 4.1 g/10 minutes.

Reference Example 2-2

A hydroxyl-modified propylene copolymer (A-2) was obtained by the same method as that employed in Reference Example 2-1 with the exception that the amount of benzoyl peroxide was 40 g. The content of 2-hydroxyethyl methacrylate was 3.2% by weight, and MFR was 1.8 g/10 minutes.

Reference Example 2-3

A hydroxyl-modified propylene copolymer (A-3) was obtained by the same method as that employed in Reference Example 2-1 with the exception that the crystalline olefin copolymer obtained in Reference Example 1-2 was used in place of the crystalline olefin copolymer obtained in Reference Example 1-1. The content of 2-hydroxyethyl methacrylate was 1.8% by weight, and MRF was 9.1 g/10 minutes.

Reference Example 2-4

A hydroxyl-modified polypropylene resin (A-4) was obtained by the same method as that employed in Reference Example 2-1 with the exception that polypropylene (produced by Mitsubishi Petrochemical Co., Ltd., Trade Name TA8, MFR 0.9 g/10 minutes) was used in place of the crystalline olefin copolymer. The content of 2-hydroxyethyl methacrylate was 0.9% by weight, and MFR was 17.4 g/10 minutes.

Reference Example 3 (Synthesis of epoxy-modified polyolefin resin)

Reference Example 3-1

250 g of crystalline olefin copolymer obtained in Reference Example 1-1 and 75 g of glycidyl methacrylate were added to 5000 ml of xylene contained in a 10-1 flask with an agitator, the air in which was previously replaced by nitrogen. The resultant mixture was then agitated at 110° C. to form a solution. 500 ml of xylene solution containing 25 g of benzoyl peroxide was then added dropwise to the solution obtained over a period of 2 hours, followed by reaction at 110° C. for 3 hours. The product was then separated by pouring the reaction product into cold acetone, filtered off, washed and then dried to obtain glycidyl methacrylate graft-modified propylene copolymer (B-1). The resin contained 2.8% by weight of glycidyl methacrylate (infrared absorption analysis method) and had MFR at 230° C. of 2 g/10 minutes.

Reference Example 3-2

95 parts by weight of crystalline olefin copolymer obtained in Reference Example 1-1, 5 parts by weight of glycidyl methacrylate, 1 part by weight of dicumyl peroxide were melted and kneaded using an extruder TEX30 manufactured by Nihon Seikosho at 240° C., 250 r.p.m. and a supply rate of 10 kg/hr. The average retention time was about 5 minutes. The glycidyl methacrylate graft-modified polypropylene resin (B-2) obtained contained 2.5% by weight of glycidyl methacrylate and had MFR of 11.3 g/10 minutes.

Reference Example 3-3

An epoxy-modified propylene copolymer (B-3) was obtained by the same method as that employed in Reference Example 3-1 with the exception that the crystalline olefin copolymer obtained in Reference Example 1-2 was used in place of the crystalline olefin copolymer used in Reference Example 3-1. The content of glycidyl methacrylate was 2.5% by weight, and MFR was 18 g/10 minutes.

Reference Example 3-4

An epoxy-modified polypropylene resin (B-4) was obtained by the same method as that employed in Reference Example 3-1 with the exception that propylene homopolymer (produced by Mitsubishi Petrochemical Co., Ltd., Trade Name TA8, MFR 0.9 g/10 minutes) was used in place of the crystalline olefin copolymer used in Reference Example 3-1. The content of glycidyl methacrylate was 0.6% by weight, and MFR was 31 g/10 minutes.

Reference Example 3-5

An epoxy-modified polypropylene resin (B-5) was obtained by the same method ass that employed in Reference Example 3-2 with the exception that propylene homopolymer (produced by Mitsubishi Petrochemical Co., Ltd., Trade Name TA8, MFR 0.9 g/10 minutes) was used in place of the crystalline olefin copolymer used in Reference Example 3-2. The content of glycidyl methacrylate was 0.5% by weight, and MFR was 95 g/10 minutes.

Reference Example 4 (Synthetic example of acid-modified polyolefin resin)

Reference Example 4-1

50 g of crystalline olefin copolymer obtained in Reference Example 1-1 and 10 g of maleic anhydride were added to 1000 ml of chlororbenzene. The resultant mixture was then agitated at 110° C. to form a solution. 150 ml of chlorobenzene solution containing 5 g of benzoyl peroxide was then added dropwise to the solution over a period of 2 hours, followed by reaction at 110° C. for 3 hours. The product obtained was separated by pouring the reaction solution into cold acetone, filtered off, washed and dried to obtain maleic anhydride graft-modified propylene copolymer (C-1). The resin contained 11.0% by weight of maleic anhydride (infrared absorption method) and had MFR at 230° C. of 12.2 g/10 minutes.

Reference Example 4-2

44 g of crystalline olefin copolymer obtained in Reference Example 1-1, 2 g of maleic anhydride and 0.1 g of dicumyl peroxide were melted and kneaded using a Labo Plastomill (manufactured by Toyo-seiki Seisaku-sho) at 200° C., 60 rpm for 10 minutes to obtain a maleic anhydride graft-modified propylene copolymer (C-2). The content of maleic acid was 5.3% by weight, and MFR was 2.7 g/10 minutes.

Reference Example 4-3

A maleic anhydride graft-modified propylene copolymer (C-3) (maleic acid content 10.4 wt %, MFR 88.7 g/10 minutes) was obtained by the same method as that employed in Reference Example 4-1 with the exception that the crystalline olefin copolymer obtained in Reference Example 1-2 was used in place of the crystalline olefin copolymer obtained in Reference Example 1-1.

Reference Example 4-4

A maleic anhydride graft-modified polypropylene resin (C-4) was obtained by the same method as that employed in Reference Example 4-1 with the exception that propylene homopolymer (produced by Mitsubishi Petrochemical Co., Ltd, Trade Name TA8, MFR 0.9 g/10 minutes) was used in place of the crystalline olefin copolymer used in Reference Example 4-1. The maleic anhydride content was 1.1% by weight, and MFR was 127 g/10 minutes.

EXAMPLE 1

22.5 g of hydroxyl-modified propylene copolymer (A-1) obtained in Reference Example 2-1, and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 5.0 kgf·cm/cm$^2$. It was recognized that the polyamide was uniformly present as a fine dispersion phase of 1 to 2 microns.

COMPARATIVE EXAMPLES 1 and 2

A composition was obtained by the same method as that employed in Example 1 with the exception that propylene homopolymer (produced by Mitsubishi Petrochemical Co., Ltd., Trade Name MA4, MFR 12 g/10 minutes) was used in place of the hydroxyl-modified polypropylene resin (A-1) used in Example 1. The impact resistance strength of the obtained composition was as low as 2.5 kgf·cm/cm$^2$, and it was observed that the polyamide was present as large particles of 10 microns or more.

The composition obtained by the same method as that employed in Example 1 with the exception that the hydroxyl-modified polypropylene resin (A-4) obtained in Reference Example 2-4 was used in place of the resin (A-1) had an impact resistance strength of 3.0 kgf·cm/cm$^2$, and contained a polyamide dispersed phase having a size of about 3 microns.

EXAMPLE 2

A composition was obtained by the same method as that employed in Example 1 with the exception that the hydroxyl-modified propylene copolymer (A-2) obtained in Reference Example 2-2 was used. The composition obtained showed an impact resistance strength of 4.7 kgf·cm/cm$^2$, and it was recognized that the polyamide was uniformly present as a fine dispersed phase of about 1 micron.

EXAMPLE 3

9 g of hydroxyl-modified propylene copolymer (A-2) obtained in Reference Example 2-2, 13.5 g of polypropylene (produced by Mitsubishi Petrochemical Co., Ltd., Trade Name MA4) and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 8.1 kgf·cm/cm$^2$, and it was recognized that the polyamide was uniformly present as a fine dispersed phase of 1 to 3 microns.

EXAMPLE 4

22.5 g of hydroxyl-modified propylene copolymer (A-3) obtained in Reference Example 2-3 and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 4.0 kgf·cm/cm$^2$, and it was recognized that the polyamide was uniformly present as a fine dispersed phase of 1 to 2 microns.

EXAMPLES 5 AND 6

A composition of Example 5 was obtained by the same method as that employed in Example 1 with the exception that the mixing amounts of hydroxyl-modified propylene copolymer (A-1) and polycaproamide used in Example 1 were 13.5 g and 31.5 g, respectively. The mixing amounts were further changed to 31.5 g and 13.5 g to obtain a composition of Example 6.

The values of impact resistance strength of the compositions of Examples 5 and 6 were 7.0 kgf·cm/cm$^2$ and 4.2 kgf·cm/cm$^2$, respectively. The dispersion diameters of polypropylene and polycaproamide were from 1 to 3 microns and 1 micron, respectively.

EXAMPLE 7

22.5 g of hydroxyl-modified propylene copolymer (A-1) obtained in Reference Example 2-1 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 7.5 kgf·cm/cm$^2$, and it was recognized that the polybutylene terephthalate was uniformly present as a fine dispersed phase of about 1 micron.

COMPARATIVE EXAMPLE 3

A composition was obtained by the same method as that employed in Example 7 with the exception that polypropylene (Mitsubishi Petrochemical Co., Ltd. Trade Name MA4, MFR 12 g/10 minutes) was used in place of the hydroxyl-modified polypropylene resin (A-1) used in Example 7. The composition obtained showed an impact resistance strength of as low as 2.4 kgf·cm/cm$^2$, and it was observed that the polybutylene terephthalate component was present as a large particle of about 50 microns or more.

EXAMPLE 8

22.5 g of hydroxyl-modified propylene copolymer (A-3) obtained in Reference Example 2-3 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 6.1 kgf·cm/cm$^2$, and it was recognized that the polybutylene terephthalate was uniformly present as a fine dispersed phase of about 1 micron.

EXAMPLES 9 and 10

A composition of Example 9 was obtained by the same method as that employed in Example 7 with the exception that hydroxyl-modified propylene copolymer (A-2) obtained in Reference Example 2-2 was used in place of the hydroxyl-modified polypropylene resin (A-1) used in Example 7, and that the mixing amounts of polypropylene resin and polybutylene terephthalate were 15.7 g and 29.3 g, respectively. The mixing amounts were further changed to 29.3 g and 15.7 g to obtain a composition of Example 10.

The values of impact resistance strength of the compositions of Examples 9 and 10 were 7.0 kgf·cm/cm$^2$ and 4.5 kgf·cm/cm$^2$, respectively.

EXAMPLE 11

22.5 g of epoxy-modified propylene copolymer (B-1) obtained in Reference Example 3-1 and 22.5 g of polycaproamide (produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 7.0 kgf·cm/cm$^2$, and it was recognized that the polyamide was uniformly present as a fine dispersed phase of about 1 micron.

COMPARATIVE EXAMPLE 4

A composition was obtained by the same method as that employed in Example 11 with the exception that the epoxy-modified polypropylene resin (B-4) obtained in Reference Example 3-4 was used in place of the resin (B-1). The composition obtained showed an impact resistance strength of 2.4 kgf·cm/cm$^2$, and the polyamide dispersed phase had a size of about 3 microns.

EXAMPLE 12

9 g of epoxy-modified propylene copolymer (B-2) obtained in Reference Example 3-2, 13.5 g of polypropylene (manufactured by Mitsubishi Petrochemical Co., Ltd., Trade Name MA4) and 22.5 g of polycaproamide (produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 7.9 kgf·cm/cm$^2$, and it was recognized that the polyamide was uniformly present as a fine dispersed phase of about 1 micron.

EXAMPLE 13

22.5 g of epoxy-modified propylene copolymer (B-3) obtained in Reference Example 3-3 and 22.5 g of polycaproamide (produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 5.2 kgf·cm/cm$^2$, and it was recognized that the polyamide was uniformly present as a fine dispersed phase of about 1 micron.

EXAMPLES 14 AND 15

A composition of Example 14 was obtained by the same method as that employed in Example 11 with the exception that the mixing amounts of epoxy-modified propylene copolymer and polyamide were 13.5 g and 31.5 g, respectively. The mixing amounts were further changed to 31.5 g and 13.5 g to obtain a composition of Example 15.

The values of impact resistance strength of the compositions of Examples 14 and 15 were 7.4 kgf·cm/cm$^2$ and 4.5 kgf·cm/cm$^2$, respectively. The dispersion diameters of polypropylene and polyamide were 3 microns and less than 1 micron, respectively.

EXAMPLE 16

22.5 g of epoxy-modified propylene copolymer (B-1) obtained in Reference Example 3-1 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 9.1 kgf·cm/cm$^2$, and it was recognized that the polybutylene terephthalate was uniformly present as a fine dispersed phase of about 0.6 micron.

COMPARATIVE EXAMPLE 5

A composition was obtained by the same method as that employed in Example 16 with the exception that the crystalline olefin copolymer obtained in Reference Example 1-1 was used in place of the epoxy-modified polypropylene resin (B-1) used in Example 16. The composition obtained showed an impact resistance strength of 4.1 kgf·cm/cm$^2$, but the butylene terephthalate component was present as large particles having a typical particle size of 50 microns or more. The molded sample had an appearance in which the layer was partially separated.

COMPARATIVE EXAMPLE 6

A composition was obtained by the same method as that employed in Example 16 with the exception that the epoxy-modified polypropylene resin (B-5) obtained in Reference Example 3-5 was used in place of the epoxy-modified polypropylene resin (B-1) used in Example 16. The composition obtained showed fine dispersion of about 2 microns, but an impact resistance strength was as low as 2.2 kgf·cm/cm$^2$.

EXAMPLE 17

22.5 g of epoxy-modified propylene copolymer (B-3) obtained in Reference Example 3-3 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 6.9 kgf·cm/cm$^2$, and it was recognized that the polybutylene terephthalate was uniformly present as a fine dispersed phase of about 1 micron.

EXAMPLES 18 and 19

A composition of Example 18 was obtained by the same method as that employed in Example 16 with the exception that the mixing amounts of epoxy-modified propylene copolymer and polybutylene terephthalate were 13.5 g and 31.5 g, respectively. The mixing amounts were further changed to 31.5 g and 13.5 g to obtain a composition of Example 19.

The values of impact resistance strength of the compositions of Examples 18 and 19 were 11.5 kgf·cm/cm$^2$ and 4.9 kgf·cm/cm$^2$, respectively

EXAMPLE 20

22.5 g of acid-modified propylene copolymer (C-1) obtained in Reference Example 4-1 and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 7.2 kgf·cm/cm$^2$, and it was recognized that the polyamide was uniformly present as a fine dispersed phase of 0.1 to 0.3 micron.

COMPARATIVE EXAMPLE 7

A composition was obtained by the same method as that employed in Example 20 with the exception that the acid-modified polypropylene resin (C-4) obtained in Reference Example 4-4 was used in place of the acid-modified polypropylene resin (C-1) used in Example 20. The polyamide was present as a fine particle of 0.5 micron or less, but the composition obtained had an impact resistance strength of 2.0 kgf·cm/cm$^2$.

EXAMPLE 21

9 g of acid-modified propylene copolymer (C-2) obtained in Reference Example 4-2, 13.5 g of propylene homopolymer (Mitsubishi Petrochemical Co., Ltd. Trade Name MA4) and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 6.0 kgf·cm/cm$^2$, and it was recognized that the polyamide was uniformly present as a fine dispersed phase of 0.6 micron.

EXAMPLE 22

9 g of acid-modified propylene copolymer (C-3) obtained in Reference Example 4-3 and 22.5 g of polycaproamide (polyamide-6 produced by BASF Co., Trade Name Ultramide KR4411) which was previously dried under vacuum at 80° C. for 15 hours were melted and kneaded using a Labo Plastomill to obtain a composition. The composition obtained showed an impact resistance strength of 7.0 kgf·cm/cm$^2$, and it was recognized that the polyamide was uniformly present as a fine dispersed phase of 0.1 to 0.3 micron.

EXAMPLES 23 and 24

A composition of Example 23 was obtained by the same method as that employed in Example 20 with the exception that the acid-modified propylene copolymer (C-3) obtained in Reference Example 4-3 was used in place of the acid-modified propylene copolymer (C-1) used in Example 20 and that the mixing amounts of acid-modified propylene copolymer and polycaproamide were 15.7 g and 29.3 g, respectively. The mixing amounts were further changed to 29.3 g and 15.7 g to obtain a composition of Example 24.

The values of impact resistance strength of the compositions of Examples 23 and 24 were 11.2 kgf·cm/cm$^2$ and 4.1 kgf·cm/cm$^2$, respectively.

EXAMPLE 25

22.5 g of acid-modified propylene copolymer (C-1) obtained in Reference Example 4-1 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 12.3 kgf·cm/cm$^2$, and it was recognized that the polybutylene terephthalate was uniformly present as a fine dispersed phase of about 2 microns.

EXAMPLE 26

22.5 g of acid-modified propylene copolymer (C-3) obtained in Reference Example 4-3 and 22.5 g of polybutylene terephthalate (produced by Mitsubishi Kasei Corp., Trade Name Novadol 5010) which was previously dried under vacuum at 80° C. for 15 hours were melted and kneaded using a Labo Plastomill to obtain a composition. The composition obtained showed an impact resistance strength of 12.0 kgf·cm/cm$^2$, and it was recognized that the polybutylene terephthalate was uniformly present as a fine dispersed phase of about 3 microns.

EXAMPLES 27 AND 28

A composition of Example 27 was obtained by the same method as that employed in Example 25 with the exception that the acid-modified propylene copolymer (C-3) obtained in Reference Example 4-3 was used in place of the acid-modified polypropylene resin (C-1) used in Example 25 and that the mixing amounts of acid-modified polypropylene resin and polybutylene terephthalate were 13.5 g and 31.5 g, respectively. The mixing amounts were further changed to 31.5 g and 13.5 g to obtain a composition of Example 28.

The values of impact resistance strength of the compositions of Examples 27 and 28 were 11.8 kgf·cm/cm² and 4.4 kgf·cm/cm², respectively.

The above results are summarized in Tables 1 to 6 in which the mixing ratio is shown in terms of % by weight.

TABLE 1

|  | Example |  |  |  |  |  | Comparative Example |  |
|---|---|---|---|---|---|---|---|---|
|  | 1 | 2 | 3 | 4 | 5 | 6 | 1 | 2 |
| Composition (parts by weight) | | | | | | | | |
| A-1 | 50 | — | — | — | 30 | 70 | — | — |
| A-2 | — | 50 | 20 | — | — | — | — | — |
| A-3 | — | — | — | 50 | — | — | — | — |
| A-4 | — | — | — | — | — | — | — | 50 |
| polypropylene*1 | — | — | 30 | — | — | — | 50 | — |
| polyamide-6*2 | 50 | 50 | 50 | 50 | 70 | 30 | 50 | 50 |
| Physical Property | | | | | | | | |
| Izot impact strength (kg·cm/cm²) | 5.0 | 4.7 | 8.1 | 4.0 | 7.0 | 4.2 | 2.5 | 3 |
| State of dispersion | | | | | | | | |
| component | P.A.*3 | P.A. | P.A. | P.A. | P.P.*4 | P.A. | P.A. | P.A. |
| particle size (μm) | 1~2 | 1 | 1~3 | 1~2 | 1~3 | 1 | 10 (or more) | 3 |

*1 "MA4" manufactured by Mitsubishi Petrochemical Co.
*2 "Ultramid KR 4411" manufactured by BASF
*3 polyamid
*4 polypropylene

TABLE 2

|  | Example |  |  |  | Comparative Example |
|---|---|---|---|---|---|
|  | 7 | 8 | 9 | 10 | 3 |
| Composition (parts by weight) | | | | | |
| A-1 | 50 | — | — | — | — |
| A-2 | — | — | 35 | 65 | — |
| A-3 | — | 50 | — | — | — |
| A-4 | — | — | — | — | — |
| polypropylene*1 | — | — | — | — | 50 |
| polybutylene terephthalate*5 | 50 | 50 | 65 | 35 | 50 |
| Physical Property | | | | | |
| Izot impact strength (kg·cm/cm²) | 7.5 | 6.1 | 7.0 | 4.5 | 2.4 |
| State of dispersion | | | | | |
| component | P.B.T.*6 | P.B.T. | PP | P.B.T. | P.B.T. |
| particle size (μm) | 1 | 1 | 1~3 | 1 | 50 (or more) |

*5 "Novadol 5010" manufactured by Mitsubishi Kasei Corp.
*6 polybutylene terephthalate

TABLE 3

|  | Example |  |  |  |  | Comparative Example |
|---|---|---|---|---|---|---|
| Composition | 11 | 12 | 13 | 14 | 15 | 4 |
| (parts by weight) | | | | | | |
| B-1 | 50 | — | — | 30 | 70 | — |
| B-2 | — | 20 | — | — | — | — |
| B-3 | — | — | 50 | — | — | — |
| B-4 | — | — | — | — | — | 50 |
| B-5 | — | — | — | — | — | — |
| polypropylene*1 | — | 30 | — | — | — | — |
| polyamide-6*2 | 50 | 50 | 50 | 70 | 30 | 50 |
| Physical Property | | | | | | |
| Izot impact strength (kg·cm/cm²) | 7 | 7.9 | 5.2 | 7.4 | 4.5 | 2.4 |
| State of dispersion | | | | | | |
| component | P.A.*3 | P.A. | P.A. | P.P.*4 | P.A. | P.A. |
| particle size (μm) | 1 | 1 | 1 | 3 | 1 (or less) | 3 |

TABLE 4

|  | Example |  |  |  | Comparative Example |  |
|---|---|---|---|---|---|---|
|  | 16 | 17 | 18 | 19 | 5 | 6 |
| Composition (parts by weight) | | | | | | |
| B-1 | 50 | — | 30 | 70 | — | — |
| B-2 | — | — | — | — | — | — |
| B-3 | — | 50 | — | — | — | — |
| B-4 | — | — | — | — | — | — |
| B-5 | — | — | — | — | — | 50 |
| polypropylene*1 | — | — | — | — | — | — |
| crystalline olefin copolymer*7 | — | — | — | — | 50 | — |
| polybutylene terephthalate*5 | 50 | 50 | 70 | 30 | 50 | 50 |
| Physical Property | | | | | | |
| Izot impact strength (kg·cm/cm²) | 9.1 | 6.9 | 11.5 | 4.9 | 4.1 | 2.2 |
| State of dispersion | | | | | | |
| component | P.B.T.*6 | P.B.T. | PP | P.B.T. | P.B.T. | P.B.T. |
| particle size (μm) | 0.6 | 1 | 1 (or less) | 0.5 | 50 (or more) | 2 |

*7 produced by Reference Example 1-1

TABLE 5

| | Example 20 | Example 21 | Example 22 | Example 23 | Example 24 | Comparative Example 7 |
|---|---|---|---|---|---|---|
| Composition (parts by weight) | | | | | | |
| C-1 | 50 | — | — | — | — | — |
| C-2 | — | 20 | — | — | — | — |
| C-3 | — | — | 50 | 35 | 65 | — |
| C-4 | — | — | — | — | — | 50 |
| polypropylene*1 | — | 30 | — | — | — | — |
| polyamide-6*2 | 50 | 50 | 50 | 65 | 35 | 50 |
| Physical Property | | | | | | |
| Izot impact strength (kg·cm/cm$^2$) | 7.2 | 6.0 | 7.0 | 11.2 | 4.1 | 2.0 |
| State of dispersion | | | | | | |
| component particle size (μm) | P.A.*3 0.1~0.3 | P.A. 0.6 (or less) | P.A. 0.1~0.3 | P.A. 0.1~0.3 | P.A. 0.1~0.3 | P.A. 0.5 (or less) |

TABLE 6

| | Example 25 | Example 26 | Example 27 | Example 28 |
|---|---|---|---|---|
| Composition (parts by weight) | | | | |
| C-1 | 50 | — | — | — |
| C-2 | — | — | — | — |
| C-3 | — | 50 | 30 | 70 |
| C-4 | — | — | — | — |
| polypropylene*1 | — | — | — | — |
| crystalline olefin copolymer*7 | — | — | — | — |
| Polybutylene terephthalate*5 | 50 | 50 | 70 | 30 |
| Physical Property | | | | |
| Izot impact strength (kg·cm/cm$^2$) | 12.3 | 12.0 | 11.8 | 4.4 |
| State of dispersion | | | | |
| component particle size (μm) | P.B.T.*6 2 | P.B.T. 3 | P.B.T. 5 | P.B.T. 2 |

What is claimed is:

1. A resin composition comprising, based on 100% by weight of components (A) and (B):

Component (A): 90 to 10% by weight of modified polyolefin resin obtained by introducing a group selected from the group consisting of a) hydroxyl group, b) epoxy group and c) carboxyl group into a crystalline olefin copolymer having a melt flow rate (MFR) of 0.01 to 500 g/10 minutes which is measured at 230° C. and a load of 2.16 kgf according to ASTM D1238-86 and an elastic modulus of 500 to 8,000 kg/cm$^2$ which is measured according to ASTM D790-86, and a crystallinity of at least 10% measured by X-ray diffraction at room temperature, consisting of propylene and 0.05 to 30 mole % of at least one non-conjugated diene expressed by the formula:

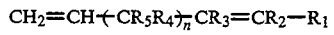

$$CH_2=CH \text{-}(CR_5R_4)_{\overline{n}} CR_3=CR_2 \text{-} R_1$$

wherein $R_1$ is an alkyl group having 1 to 8 carbon atoms, $R_2$, $R_3$, $R_4$ and $R_5$ is each a hydrogen atom or an alkyl group having 1 to 8 carbon atoms, n is a number of 1 to 10; and Component (B): 10 to 90% by weight of polyamide resin or saturated polyester resin.

2. A resin composition according to claim 1, wherein said crystalline olefin copolymer is selected from the group consisting of propylene/7-methyl-1,6-octadiene copolymer, and propylene/methyl-1,4-hexadiene copolymer.

3. A resin composition according to claim 1, wherein a hydroxyl-modified polyolefin resin is obtained by radical polymerization of 100 parts by weight of crystalline olefin copolymer and 0.1 to 10 parts by weight of hydroxyl group-containing monomer selected from the group consisting of 2-hydroxyethyl methacrylate, 2-hydroxyethyl acrylate, and 2-hyroxypropyl acrylate.

4. A resin composition according to claim 1, wherein an epoxy-modified polyolefin resin is obtained by radical reaction of 100 parts by weight of crystalline olefin copolymer and 0.1 to 10 parts by weight of glycidyl ester of an α,β-unsaturated acid.

5. A resin composition according to claim 1, wherein a carboxyl-modified polyolefin resin is obtained by radical reaction of 100 parts by weight of crystalline olefin copolymer and 0.1 to 10 parts by weight of α,β-unsaturated carboxylic acid.

6. A resin composition according to claim 1, wherein said carboxyl-modified olefin copolymer is said olefin copolymer modified with the anhydride of maleic acid.

7. A resin composition according to claim 1, wherein said polyamide resin is a resin selected from nylon 6 and nylon 66.

8. A resin composition according to claim 1, wherein said saturated polyester resin is a resin selected from the group consisting of polyethylene terephthalate and polybutylene terephthalate.

* * * * *